W. E. KLEINE.
CAN TRUCK.
APPLICATION FILED SEPT. 4, 1915.

1,168,008.

Patented Jan. 11, 1916.

INVENTOR
William E. Kleine

BY
ATTORNEYS

WITNESS:

UNITED STATES PATENT OFFICE.

WILLIAM E. KLEINE, OF HIGHWOOD, NEW JERSEY.

CAN-TRUCK.

1,168,008.   Specification of Letters Patent.   Patented Jan. 11, 1916.

Application filed September 4, 1915. Serial No. 48,943.

*To all whom it may concern:*

Be it known that I, WILLIAM E. KLEINE, a citizen of the United States, residing in Highwood, Bergen county, State of New Jersey, have invented certain new and useful Improvements in Can-Trucks, of which the following is a specification, reference being had to the accompanying drawings, forming a part hereof.

This invention relates to can trucks for the use of street sweepers and has for its object to provide a carrier which shall be of simple and rugged construction, inexpensive to manufacture, compact in design, and capable of supporting two cans, one of which shall always be in convenient position for use.

A further feature of the invention resides in the construction of the supporting wheels for the truck and the disposition of the platforms for the cans in relation thereto, these wheels being so mounted as to afford, at all times, a substantial supporting base for the truck, and yet permit the loaded truck, in use, to be rolled conveniently on two wheels only, thereby giving that desirable facility of control which is advantageous on city streets.

In accordance with the invention the frame of the truck has mounted thereon two platforms on which the respective cans are supported and these platforms are relatively inclined so that the axes of the cans are relatively inclined. The main support for the truck is provided by two large wheels which are fixed on an axle disposed between the cans in such manner that the entire truck is substantially balanced about this axle. At the ends of the supporting platforms are fixed pairs of small wheels which, in conjunction with the larger wheels, afford a four point support for the truck, one of the pairs of smaller wheels being out of contact with the street surface when the other pair is in contact therewith, by reason of the inclination of the platforms.

Other features of the invention reside in the devices for retaining the cans in position removably and in the adjustable handle by which the cart is pushed.

Reference is now to be had to the accompanying drawings for a detailed description of the preferred embodiment of the invention, in which—

Figure 1:
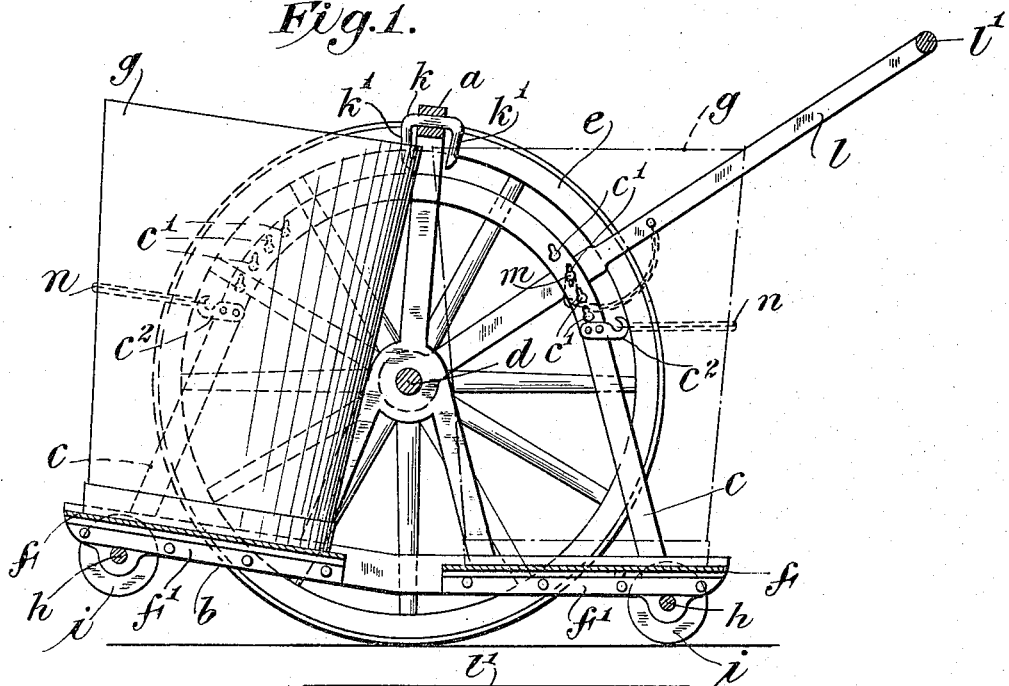
Figure 2:
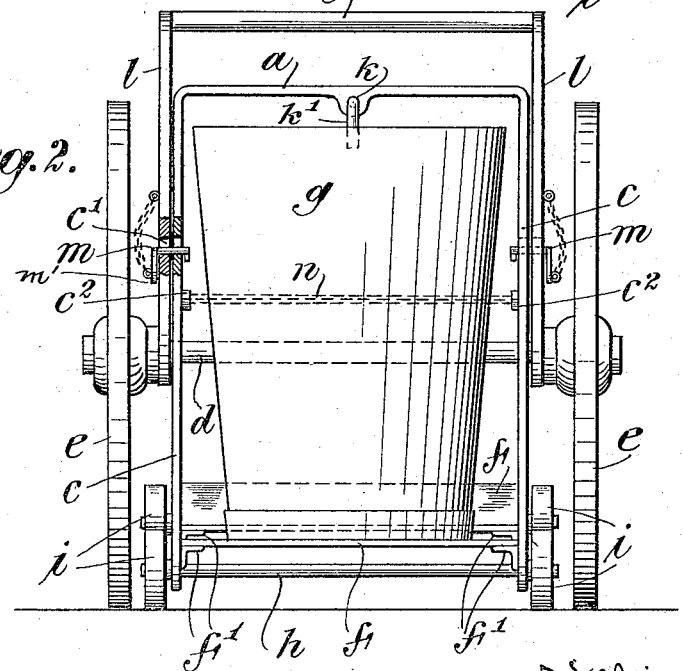

Figure 1 is a view partly in side elevation and partly in section of an improved truck on the platform of which are indicated two cans. Fig. 2 is a view in end elevation of the truck shown in Fig. 1.

The frame of the truck may be made up in any suitable form although in keeping with the general objects of the invention it is desirable that this frame should be of simple but durable construction. In the illustrated embodiment, there is provided a single transverse U-shaped frame member $a$ to the lower ends of the legs of which are secured longitudinally extending side frame members $b$ which are slightly bent at their mid-sections as indicated in Fig. 1 for reasons which will later appear. The truck frame proper may be further reinforced by curved side members $c$ which are secured at their ends to the longitudinal frame members $b$ at points adjacent the ends of the latter. In the vertically extending legs of the main transverse frame member $a$ is journaled an axle $d$ for the large wheels $e$ which constitute the principal rolling support for the cart. To the longitudinal frame members $b$ are secured two platforms $f$, as through angle irons $f'$, and on these platforms are supported, respectively, the refuse cans $g$. It will now be evident that by reason of the bending of the frame members $b$ at their mid-sections, the supporting platforms $f$ for the cans will be angularly inclined to one another and the axes of the cans will also be inclined. Further, the construction thus far described is such that the center of gravity of the carrier falls in about the same vertical plane with the axle $d$ so that the truck may be held in approximately balanced position about the axle with comparatively slight effort on the part of the attendant and its manipulation on the two wheels $e$ be thereby facilitated.

Adjacent the ends of the bent longitudinal frame members $b$ are journaled axles $h$ on the ends of which at opposite sides of the truck are secured small wheels $i$, of equal diameters. One pair of these wheels $i$ with the large wheels $e$ afford a firm base for the truck when the latter is not balanced about the axle $d$ of the large wheels, it being evident from Fig. 1 that when one pair of small wheels is resting on the surface of the street, the other pair of wheels, by reason of the bent members $d$, are out of contact with the street surface.

The cans $g$ may be secured removably in place on the respective platforms $f$ by means of a forked latch $k$ journaled at about the mid-point of the transverse portion of the main frame member $a$, the legs $k'$ of the latch $k$ extending downwardly into the cans $g$ and engaging the same adjacent the rims so that the cans are held in place. It is evident that when the latch $k$ is rotated to swing the legs $k'$ out of engagement with the cans, the latter may be removed.

The truck may be provided with a suitable handle $l$ which is supported pivotally on the axle $d$ and is provided with a convenient grip $l'$ for the hands of the attendant, this entire handle being rotatable about the axle $d$ and adjustable to any desired inclination, as may be best suited for the pushing of the cart. The handle may be held in adjusted position by means of key-shaped pins $m$ which pass through the side arms of the handle and enter one of a series of key-hole slots $c'$ formed in the curved side frame members $c$. The key is formed with a weighted end $m'$ which holds it, by gravity, in such relation to the keyhole slots that it cannot be withdrawn therefrom without rotating it through an angle of about 180° when it may pass through the slots, in a manner usual with ordinary keys. When desired, other retaining devices for the cans may be employed, either alone or in conjunction with the latch $k$, and these retaining means are indicated in Fig. 1 as comprising chains $n$ secured at one end to one of the side curved frame members $c$ and arranged to partially encircle the respective cans and be hooked releasably at their ends to suitable hooks $c^2$ fastened to the opposite curved frame member.

The purely structural aspects of the improvements having been described, a description of the advantages to be realized in the operation of the carrier may be conducive to a clearer understanding of the invention. When the truck is at rest one pair of small wheels $i$ and the large wheels $e$ will constitute a base which insures stability. The attendant may place the two cans $g$ on the respective platforms after turning the latch $k$ out of the way and may then permit the latch to engage the proximate rims of the cans in the manner previously described. Where the chains $n$ are employed, they may be hooked around the cans in a manner which is obvious. The attendant will then swing the handle $l$ about the axle $d$ to an inclined position which is best suited to the operator and will pin the handle in this position by means of the pins $m$. In pushing the truck, the attendant will usually find it desirable to tilt it so that both pairs of small wheels $i$ will be out of contact with the surface of the street and the entire truck will be approximately balanced about the axle $d$. Of course, the control of the truck is greatly facilitated by its support on two wheels instead of on four although, when one of the cans is filled (say the can on the right in Fig. 1) it will naturally maintain the small wheels directly under it in contact with the ground at all times. After the operator has filled the other can, however, the truck will again be approximately balanced and may be rolled conveniently on the two large wheels $e$. By the construction described, a truck is provided which is of a simple and rugged nature and which is of double the capacity of the ordinary one-can truck and yet not open to any of the disadvantages which ordinarily flow from the mounting of two cans on a single two-wheeled carrier.

Modifications in the details of construction and arrangement of the parts may be made without departing from the spirit of the invention provided all such changes fall within the scope of the appended claims.

What I claim is:—

1. A can truck comprising, with an axle and wheels, a frame supported on the axle, two relatively inclined supporting platforms for the cans secured to the frame on opposite sides of the axle, and a handle.

2. A can truck comprising, with an axle and wheels, a frame supported on the axle, two relatively inclined supporting platforms for the cans secured to the frame on opposite sides of the axle, wheels supported adjacent the outer ends of the platforms respectively, the wheels at one end of one platform being out of engagement with the road surface when the wheels at the end of the other platform are in engagement therewith.

3. A can truck comprising, with an axle and large wheels, a U-shaped frame supported on the axle, relatively inclined side frame members secured to the U-shaped frame adjacent the lower ends of the legs thereof, two supporting platforms for the cans fixed in inclined positions on the side frame members on opposite sides of the axle, and pairs of relatively small wheels supported adjacent the outer ends of the platforms respectively, said last named wheels being out of contact with the road surface when the U-shaped frame lies in a vertical plane and one pair of the small wheels being out of contact with the road surface when the other pair is in contact therewith.

4. A can truck comprising, with an axle and wheels, a U-shaped frame supported on the axle, two supporting platforms for the cans secured to the frame on opposite sides of the axle, and a single latch pivoted adjacent the mid-section of the horizontal portion of the frame and having legs adapted to engage the rims of two cans, respectively.

5. A can truck comprising, with an axle and wheels, a frame supported on the axle, supporting platforms for the cans, curved frame members disposed at the sides of the frame and provided with key-hole slots therein, a handle pivoted on the axle and adapted to swing about the axle, and keys adapted to pass through the handle and the slots in the curved frame members to lock the handle in any desired position.

6. A can truck comprising, with an axle and wheels, a frame supported on the axle, supporting platforms for the cans, a handle pivoted on the axle and adapted to swing about the axle, and means to fix the handle in any desired position of adjustment.

This specification signed this 3rd day of September A. D., 1915.

WILLIAM E. KLEINE.

Copies of this patent may be obtained for five cents each, by addressing the "Commissioner of Patents, Washington, D. C."